US008893098B2

(12) United States Patent
Chase

(10) Patent No.: US 8,893,098 B2
(45) Date of Patent: Nov. 18, 2014

(54) DEFERRED TYPE INFERENCE OF GENERIC TYPE PARAMETERS IN FUNCTION CALLS TO OVERLOADED FUNCTIONS

(71) Applicant: Oracle International Corporation, Redwood City, CA (US)

(72) Inventor: David R. Chase, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 18 days.

(21) Appl. No.: 13/714,818

(22) Filed: Dec. 14, 2012

(65) Prior Publication Data

US 2014/0173573 A1 Jun. 19, 2014

(51) Int. Cl.
*G06F 9/45* (2006.01)

(52) U.S. Cl.
USPC ............................ 717/140; 717/139; 717/141

(58) Field of Classification Search
USPC .................................................. 717/136–143
See application file for complete search history.

(56) References Cited

U.S. PATENT DOCUMENTS

| 5,313,614 | A  | * | 5/1994  | Goettelmann et al. ........ 717/138 |
| 5,551,015 | A  | * | 8/1996  | Goettelmann et al. ........ 717/137 |
| 6,243,860 | B1 | * | 6/2001  | Holland ........................ 717/141 |
| 6,606,742 | B1 | * | 8/2003  | Orton et al. .................... 717/140 |
| 6,868,367 | B2 | * | 3/2005  | Yemini et al. .................. 702/183 |
| 7,100,153 | B1 | * | 8/2006  | Ringseth et al. .............. 717/140 |
| 7,627,594 | B2 | * | 12/2009 | Meijer et al. ......................... 1/1 |
| 7,636,914 | B1 | * | 12/2009 | Johnson ........................ 717/143 |
| 7,676,476 | B2 | * | 3/2010  | Meijer et al. ................ 707/999.1 |
| 7,735,070 | B2 | * | 6/2010  | von der Ahe et al. .......... 717/140 |
| 7,761,858 | B2 | * | 7/2010  | Chang et al. .................... 717/140 |
| 7,774,376 | B1 | * | 8/2010  | Meijer et al. ................... 707/802 |
| 8,201,139 | B2 | * | 6/2012  | Chang et al. .................... 717/104 |
| 8,245,204 | B2 | * | 8/2012  | Mak et al. ....................... 717/140 |
| 8,336,035 | B2 | * | 12/2012 | Lambert et al. ................ 717/136 |
| 8,397,222 | B2 | * | 3/2013  | Warren .......................... 717/143 |
| 8,473,971 | B2 | * | 6/2013  | Meijer et al. ................... 719/331 |

OTHER PUBLICATIONS

Tsafrir et al, "Minimizing Dependencies within Generic Classes for Faster and Smaller Programs", ACM, 425-444, 2009.*
Mehnert, "Extending Dylan's Type System for Better Type Inference and Error Detection", ACM, pp. 1-10, 2010.*
Gal et al, "Trace-based Just-in-Time Type Specialization for Dynamic Languages" ACM, pp. 465-478, 2009.*
Zhu et al, "Specialization for Applications Using Shared Libraries" ACM, pp. 159-168, 2008.*

* cited by examiner

*Primary Examiner* — Anil Khatri
(74) *Attorney, Agent, or Firm* — Park, Vaughan, Fleming & Dowler LLP; Chia-Hsin Suen

(57) ABSTRACT

The disclosed embodiments provide a system that facilitates the development and execution of a software program. During runtime of the software program, the system delays type inference on a generic type parameter of an implementation of an overloaded function, wherein the generic type parameter is associated with a type interval containing an unbounded lower limit and one or more self-typed constraints. Upon detecting a type query for a dynamic type of the generic type parameter, the system compares a queried type from the type query with a set of inference choices for the generic type parameter. If the queried type matches an inference choice from the set of inference choices, the system uses the inference choice to perform type inference on the generic type parameter.

17 Claims, 5 Drawing Sheets

US 8,893,098 B2

DEFERRED TYPE INFERENCE OF GENERIC TYPE PARAMETERS IN FUNCTION CALLS TO OVERLOADED FUNCTIONS

RELATED APPLICATIONS

The subject matter of this application is related to the subject matter in a co-pending non-provisional application by inventors David Chase, Guy Steele, Karl Naden, Justin Hilburn and Victor Luchangco, entitled "Fast Dispatch Predicate for Overloaded Functions with Generic Type Hierarchies that Lack Contravariance," having Ser. No. 13/601,730, and filing date 31 Aug. 2012.

The subject matter of this application is related to the subject matter in a co-pending non-provisional application by inventors Karl Naden, Justin Hilburn, David Chase, Guy Steele, Victor Luchangco and Eric Allen, entitled "Dispatch Predicate for Overloaded Functions using Type Intervals," having Ser. No. 13/601,745, and filing date 31 Aug. 2012.

The subject matter of this application is also related to the subject matter in a co-pending non-provisional application by inventors Karl Naden, David Chase and Justin Hilburn, entitled "Type Inference of Generic Type Parameters in Overloaded Functions using Type Intervals and Inference Directions," having Ser. No. 13/601,766, and filing date 31 Aug. 2012.

BACKGROUND

1. Field

The disclosed embodiments relate to function overloading in programming languages. More specifically, the disclosed embodiments relate to techniques for deferring type inference of generic type parameters in function calls to overloaded functions.

2. Related Art

Programming languages may support function and/or method overloading, in which multiple methods within an object and/or functions declared within the same scope share the same name. Such name sharing may facilitate the identification and/or grouping of functions and/or methods that perform conceptually similar tasks but operate on different types and/or amounts of data.

During invocation of an overloaded function and/or method, a programming language may dispatch a function call to the function and/or method by selecting an implementation of the function and/or method based on the types and/or number of arguments from the function call. For example, the programming language may select the most specific implementation from a set of candidate implementations of the function and/or method that are accessible and applicable. Moreover, the programming language may use multiple dispatch, which resolves the function call based on the runtime types of the function call's arguments.

However, an overloaded function and/or method may include one or more generic functions containing parameterized types. Because the generic functions may accept parameters from the same and/or overlapping sets of types, the generic functions may complicate the determination of specificity and/or applicability during dispatch of a function call to the function and/or method. The function call may also include generic type parameters, which must also be inferred for correct dispatching of the function call. In turn, the additional complexity and/or computation associated with generic functions and/or generic type parameters in overloaded functions may increase the overhead associated with runtime dispatch of function calls to the overloaded functions.

Hence, what is needed is a mechanism for performing multiple dispatch of function calls associated with generic type hierarchies and/or type inference on generic type parameters associated with the function calls.

SUMMARY

The disclosed embodiments provide a system that facilitates the development and execution of a software program. During runtime of the software program, the system delays type inference on a generic type parameter of an implementation of an overloaded function, wherein the generic type parameter is associated with a type interval containing an unbounded lower limit and one or more self-typed constraints. Upon detecting a type query for a dynamic type of the generic type parameter, the system compares a queried type from the type query with a set of inference choices for the generic type parameter. If the queried type matches an inference choice from the set of inference choices, the system uses the inference choice to perform type inference on the generic type parameter.

In some embodiments, if the queried type does not match any of the inference choices, the system further delays type inference on the generic type parameter.

In some embodiments, using the inference choice to perform type inference on the generic type parameter involves using the inference choice as an updated lower limit of the type interval, and choosing a binding for the generic type parameter based on the updated lower limit.

In some embodiments, the binding is further chosen based on a set of constraints associated with the generic type parameter.

In some embodiments, choosing the binding for the generic type parameter based on the updated lower limit involves using the inference choice as the binding for the generic type parameter if the generic type parameter is not associated with a set of constraints.

In some embodiments, the set of inference choices is bounded by the type interval.

In some embodiments, the type interval also includes an upper limit.

BRIEF DESCRIPTION OF THE FIGURES

In the figures, like reference numerals refer to the same figure elements.

DETAILED DESCRIPTION

Figure 1:
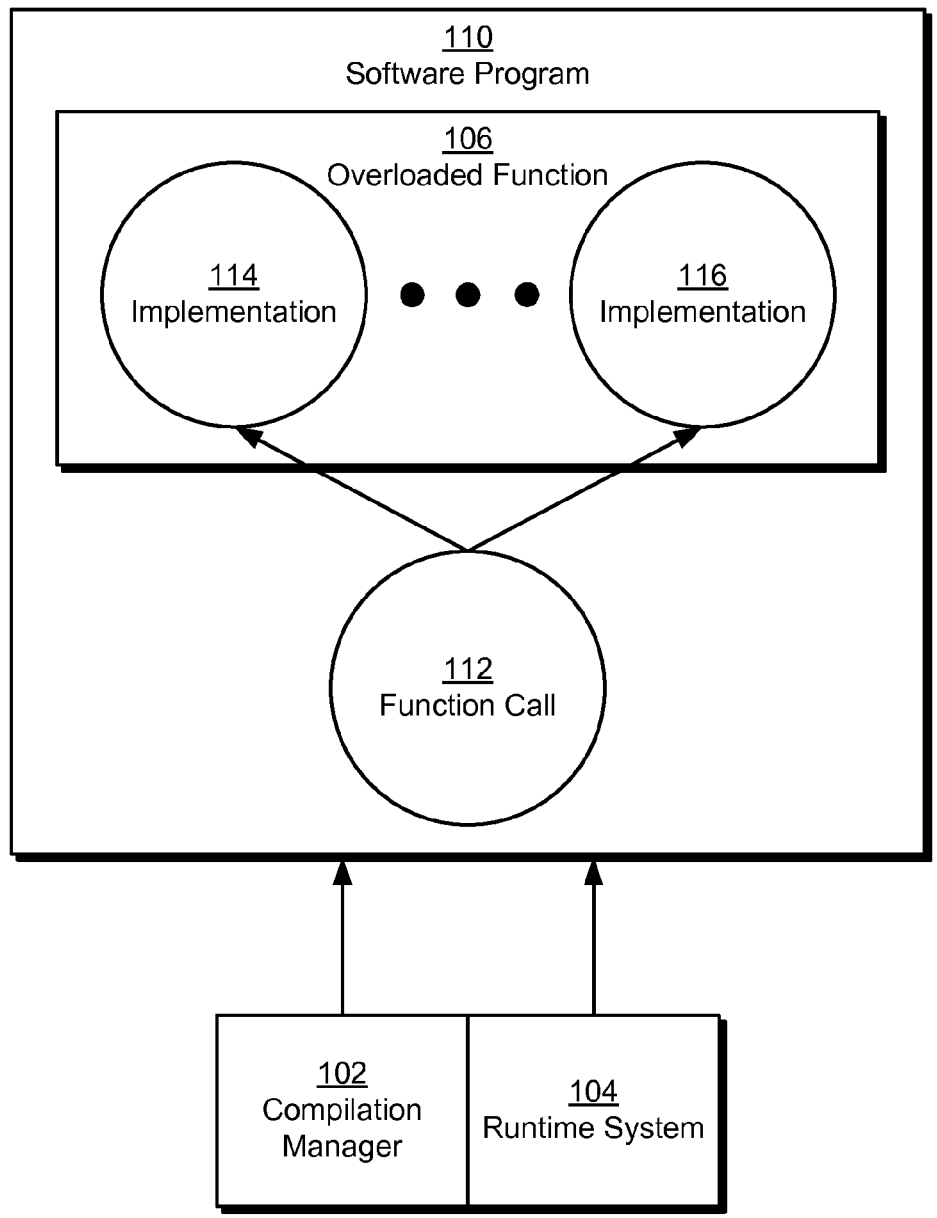
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and execution of a software program. During development of the software program, source code for the software program may be created using a programming language. The source code may then be compiled into an executable form to enable the execution of the software program.

More specifically, the disclosed embodiments provide a method and system for facilitating the development and execution of a software program in a programming language with a flexible system of generic trait and class object types, generic functions and methods, overloaded functions and methods, type inference, and static type checking. To support such features, the programming language may provide a well-defined and efficient implementation of overloaded dispatch and type inference.

First, the programming language may perform runtime dispatch of function calls associated with generic type hierarchies. During runtime of the software program, a function call to an overloaded function may be resolved based on a partial order of implementations of the overloaded function and the applicability of one or more of the implementations to the function call. For example, the partial order may correspond to a most-to-least specific order, such that the implementation selected for invocation by the function call is the most specific implementation that is applicable and accessible to the function call.

Second, the programming language may perform type inference on generic type parameters of the implementation during dispatch of the function call. During type inference, the programming language may obtain a type interval for a generic type parameter of the selected invocation, which contains an unbounded lower limit and one or more self-typed constraints. Because the unbounded lower limit may prevent the programming language from searching upwards for a unique and/or most-specific binding for the generic type parameter, the unbounded lower limit may result in more than one type-correct inference choice for the generic type parameter.

As a result, the programming language may delay type inference on the generic type parameter until a type query for a dynamic type of the generic type parameter is detected. The queried type from the type query may then be compared with a set of inference choices for the generic type parameter. If the queried type matches an inference choice from the set of inference choices, the inference choice may be used to perform type inference on the generic type parameter. If the queried type does not match any of the inference choices, type inference on the generic type parameter may be further delayed.

FIG. 1 shows a schematic of a system in accordance with the disclosed embodiments. The system includes a compilation manager 102 and runtime system 104 that may be used to manage the development and execution of a software program 110. Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, compilation manager 102 and runtime system 104 are associated with a programming language with a flexible system of generic trait and class object types, generic functions and methods, overloaded functions and methods, type inference, and static type checking. For example, compilation manager 102 and runtime system 104 may enable the development, compilation, and/or execution of code for software program 110 written in the Fortress programming language. While the discussion below relates to the Fortress programming language, those skilled in the art will appreciate that the operation of compilation manager 102 and runtime system 104 may be used with other programming languages with similar type hierarchies and/or features.

The Fortress language type system includes objects, traits, tuples, arrows, and "Any." Traits and objects form one hierarchy, tuples form another, and arrows form a third; these three hierarchies are disjoint. Fortress types are partially ordered by a subtype relation, also expressed with the verb "extends" which appears in trait and object declarations, and the symbol "<:" which appears semantically. Type X is a subtype of Y ("X extends Y", "X<: Y") if every value that is an X is also a Y. Trait and object subtyping is declared (nominal); tuple and arrow subtyping is structural. Subtyping is reflexive, transitive, and antisymmetric: X<: X, X<: Y ∧Y<: Z=>X<: Z, and X<: Y ∧Y<: X=>X=Y.

The trait and object hierarchy is rooted at the trait "Object," which extends "Any." Within the trait and object hierarchy, objects and traits both may extend traits, but nothing may extend an object type. Trait extension is part of an object or trait's declaration:

trait Shape extends Object
trait Polygon extends Shape trait Rectangle extends Polygon
trait RegularPoly extends Polygon
trait Square extends {Rectangle, RegularPoly}
object Cartesian (x:RR, y:RR) extends Point
object Polar (theta:RR, d:RR) extends Point A trait declaration may use a "comprises" clause to limit the traits and objects that can directly extend it:

trait Point comprises {Cartesian, Polar}
trait Quadrilateral comprises
{Trapezoid, Kite, Irregular, Concave}
trait Kite extends Quadrilateral
trait Trapezoid extends Quadrilateral
trait Parallelogram extends Trapezoid comprises
{Rectangle, Rhombus, Rhomboid}
trait Rectangle extends Parallelogram comprises
{Oblong, Square}
trait Rhombus comprises {Square, NotSquare} extends
{Parallelogram, Kite}
trait Square extends {Rectangle, Rhombus}

Comprised traits may be further extended (Trapezoid, Parallelogram, Rhombus); are not necessarily disjoint (Rhombus extends both Kite and Parallelogram, which in turn extends Trapezoid); and may inherit from other traits (Rhombus comprises Square, Square also extends Rectangle).

Tuple types are sequences of zero, two, or more (but not one) other types, including tuples, arrows, traits, and objects. All tuple types extend "Any," and a tuple type with $X=(X_1, X_2, \ldots X_N)$ extends $Y=(Y_1, Y_2, \ldots Y_M)$ if and only if N=M and $X_i <: Y_i$ for $1 \leq i \leq N$. That is, equal-length tuples are covariant in the types of their elements. The zero-length tuple is also known as "void" with "void type."

Arrow types are the types of functions. The arrow type D→R combines a domain type D and a range (return) type R. Arrow types are covariant in their range and contravariant in their domain type. For example, D1→R1 <: D2→R2 if and only if R1 <: R2 (note the order 1, 2, therefore covariant) and D2 <: D1 (note the order 2, 1, therefore contravariant).

By construction, Fortress types may be divided into various disjoint sets—arrows are never tuples or traits, and traits are never tuples. Because object types cannot be further extended, any object type is known to exclude any trait that it is not declared to (transitively) extend, as well as all other object types. Fortress also allows an explicit declaration of exclusion on trait types; if T excludes U, then no type may extend both T and U. Declared exclusions extend naturally into tuple and arrow types; if R excludes S, then D→R excludes E→S, and if $S_k$ excludes $T_k$, then $(S_1, \ldots, S_k, \ldots, S_a)$ excludes $(T_1, \ldots, T_k, \ldots, T_a)$.

Fortress also has generic trait and object types (pedantically speaking, first-order type operators) that combine types to form new types. Generic type declarations may include subtype constraints in their parameters:

trait Vector[\T extends Number\]
trait SortedList[\T extends Comparable[\T\] \]
trait Option[\T extends Any\]

Generic traits may also have a declared variance in their various parameters. Immutable data types like list and option can be covariant, and arrow-like types can be contravariant in their domain:

trait SortedList[\covariant T extends
Comparable[\T\] \]
trait Option[\covariant T extends Any\] trait
ArrowLike[\contravariant D,
covariant R, covariant E\]

Unless otherwise specified, two instances of a generic trait are disjoint if they differ in any one of their static parameters. For example, although Integer<: Number, Matrix[Integer] is not a subtype of Matrix[Number]. Such generic types are invariant (or, more precisely, invariant with respect to each of their static parameters).

Every constructed type has a name of the form Stem[T1, T2, ..., Tn], where Stem is an identifier and T1, T2, ..., Tn is a (possibly empty) sequence of types. If the sequence of types is empty (that is, n=0), then Stem[ ] may be abbreviated as simply Stem. Strictly speaking, however, the stem is the name of a generic type, that is, a type that has parameters. When specific type arguments a1, a2, ..., an are provided, then Stem[a1, a2, ..., an] is said to be a type that is an instance of the generic type named by the Stem. For example, List[T] is a generic type, whose values are lists whose elements are all of type T. The identifier "List" is the stem of this generic type. The generic type has one type parameter. List [String] is a specific instance of this generic type, namely the type whose values are lists whose elements are all of type String. (The type String, in turn, is understood to mean String[ ], the unique instance of the generic type having zero type parameters and whose stem is "String.")

A particular idiom used in Fortress is the "self-typed generic," where a generic in T also comprises exactly T. This usually corresponds to a property of a binary operator method such as "Comparable" or "AssociativePlus":

trait Comparable[\T\] comprises T
    opr < (self, other:T)
end
trait AssociativePlus[\T\] comprises T
    opr + (self, other:T)
end Because the only subtype of Comparable[\T\] is T, the two types include exactly the same sets of values, and are in some sense the same type.

Type inference applied to Fortress software programs may yield types that cannot be directly expressed in the source code. Analysis, optimization, and implementation are all easier to reason about when the types form a lattice, not just a partial order, and there are cases where the lattice properties are also obvious to the programmer, and may even reflect intent. This requires union and intersection types to ensure that join and meet operations are defined, plus a "bottom" type. Because no values actually have bottom type, the appearance of a bottom type indicates code that is surely "dead." When two types exclude each other, their meet is bottom.

At join points in a program (either flow join points or inference join points), "union" types may appear. In the presence of contravariant generic types, "intersection" types may appear. In this example, z's static type is X ∪ Y:

x:X= ...
y:Y= ...
z=if is Raining( ) then x else y end

In this example, a call to a generic function f results in static inference T=X ∪ Y:

f[\T\] (a:T, b:T)= ...
x:X= ...
y:Y= ...
f(x,y)

When contravariant types are joined, intersection types can result. Here, the statically inferred type for T is X ∩ Y, because X ∩ Y→( ) is a supertype of both X→( ) and Y→( ):

f[\T\] (g:T->( ), h:T->( ))= ...
x:X->( )= ...
y:Y->( )= ...
f(x, y)

Typecase statements are another source of intersection types. In each guarded clause of a typecase statement, the type of the tested expression is known to be both its static type (outside the guard) and its guard type; that is, the intersection of those two types. In this example, the type of t is known to be X # Y:

```
x:X = ...
typecase x of
    t:Y => ... t ...
end
```

Given a covariant generic G, G[\A\] ∪ G[\B\] <: G[\A ∪ B\]. Equality does not hold. Consider a set S={"cat", 11}; S is a Set[\String # Number\] but is not a Set[\String\] ∪ Set[\Number\]. For intersections of covariant generics, given restrictions on types listed below, equality does hold: G[\A\] ∩ G[\B\]=G[\A ∩ B\].

Restrictions on Fortress types include the following:
No cycles in extends relationship.
Covariant and contravariant use restriction, including supertypes.
Contravariant type parameters may only appear in contravariant context and covariant type parameters may only appear in covariant context.
Minimal instance of generic ancestors: If S<: G[\T⃗\], then there exists U⃗ such that for all T⃗ where S<: G[\T⃗\]:
 if G's ith static parameter is invariant, then $U_i = T_i$.
 if G's ith static parameter is covariant, then $U_i <: T_i$.
 if G's ith static parameter is contravariant, then $T_i <: U_i$.
 G[\U⃗\] is the minimal instance of G that S extends.
Generic of bottom is bottom: G[\∞\]=∞.
Finite depth: Foo[\T\] extends T is prohibited.
Finite depth: T<: G[\ ... \] and T<: H[\ ... \]. If G[\A\]<: H[\B\] exists then H[\C\]<: G[\D\] does not exist.
Allowed type constraints:
 T1<: T2 (T1 extends T2).
 T1<: K (T1 extends type constant expression K).
 T1<: G[\T2, T3\] (T1 extends some instantiated generic type whose instantiation contains type parameters).
Acyclic type constraints: for a set of type constraints on a generic type or function, there is an order such that each static parameter only appears on the right-hand-side of constraints following its mention on the left-hand-side of a constraint. By default, the restriction that constraints are written in such an order is imposed. For example, [T1, T2<: T1, T3<: Pair[T1, T2]] is permitted because no type is used on the right-hand-side of a constraint until after the constraint where it appears on the left. Self-typed constraints are an exception to this rule; it is permitted to declare that T1<: SomeSelfType[T1]. Because of the different subtyping structure of self-types, this is really more of an equality constraint than an inequality constraint.
Self-types meet: if T<: U=S[\U\] and T<: V=S[\V\] then T<: S[\meet(U, V)\] and meet(U, V) must be a declared (not intersection) type. In practice, this means that the instantiations of a particular self-typed generic must form a forest.

Fortress also has overloaded functions. Whenever more than one function with the same name appears in a scope, an overloaded function results, and the same-named functions become implementations that are chosen when the overloaded function is invoked. Overloaded functions may also be exported, either as explicitly overloaded functions (the multiple implementations appear in an API) or as the most general member of a set of implementations. When an overloaded function is called at runtime, the most specific of the set of implementations is chosen, considering all arguments to the function. The implementations to an overloaded function in a given scope must satisfy two rules to guarantee non-ambiguity and type safety.

First, the meet rule ensures that dispatch is unambiguous. Given two implementations f1 and f2 of the overloaded function f, either the domain of f1 excludes the domain of f2, or else f contains an implementation f3 whose domain is the meet of f1 and f2's domains (f3 may be f1, f2, or some other implementation). Second, the subtype rule ensures type safety; if f1's domain is a subtype of f2's domain, then f1's range must be a subtype of f2's range.

Fortress also supports generic type parameters in overloaded functions. Because generic type schema are not ordinary types, meet and subtype must be extended to cover this case. Dynamic subtype tests used to choose between ordinary types must also be extended to handle dispatch in the presence of generics.

As shown in FIG. 1, software program 110 may include an overloaded function 106, method, and/or subroutine that is invoked by a function call 112. Overloaded function 106 may include a set of implementations 114-116 in the same scope that share the same name but contain different types and/or numbers of parameters. During runtime of software program 110, compilation manager 102 and/or runtime system 104 may dispatch function call 112 by selecting an implementation from implementations 114-116 for invocation by function call 112.

To accommodate features of the programming language associated with software program 110, compilation manager 102 and/or runtime system 104 may provide a dispatch predicate for overloaded function 106 and/or other overloaded functions with generic type hierarchies and/or parameters that are invariant, covariant, and/or contravariant. In particular, compilation manager 102 and/or runtime system 104 may select an implementation for invocation by function call 112 based on an applicability of the implementation to function call 112 and a partial order of implementations 114-116, as discussed in further detail below with respect to FIG. 2. Compilation manager 102 and/or runtime system 104 may additionally perform type inference on generic type parameters of the selected implementation, as discussed further below with respect to FIG. 3.

Figure 2:
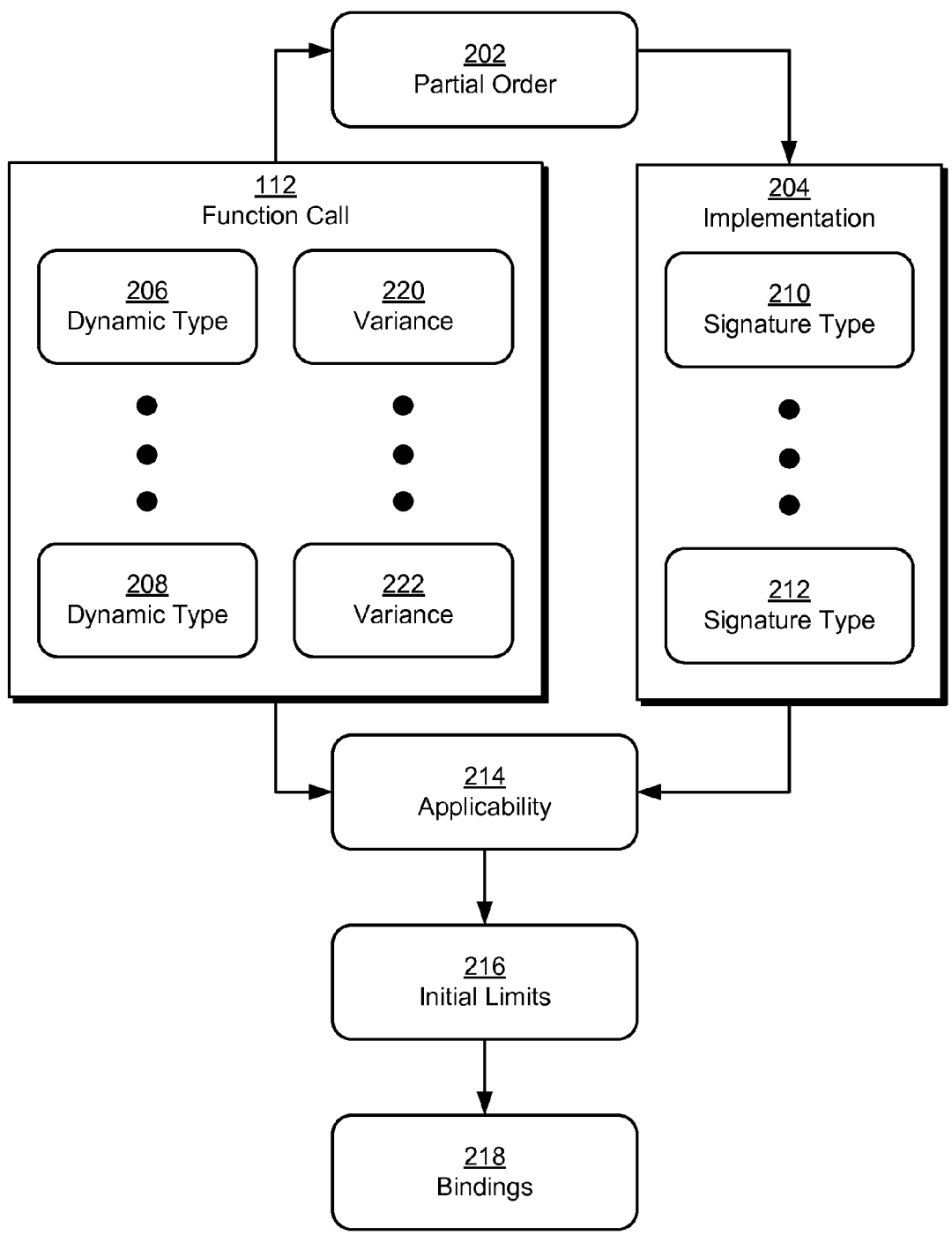
FIG. 2 shows the selection of an implementation of an overloaded function for invocation by a function call in accordance with the disclosed embodiments.

FIG. 2 shows the selection of an implementation 204 of an overloaded function (e.g., overloaded function 106 of FIG. 1) for invocation by a function call 112 in accordance with the disclosed embodiments. As mentioned above, implementation 204 may be selected based on a partial order 202 of implementations (e.g., implementations 114-116 of FIG. 1) for the overloaded function. For example, static analysis may be used to provide partial order 202 and enforce the language-level restrictions on types described above.

In addition, partial order 202 may correspond to a most-to-least specific order, so that dynamic dispatch of function call 112 may be reduced to testing a can-apply predicate for each implementation until a match is found. This reduces overload resolution to the simpler problem of determining if an implementation is applicable to the actual parameters supplied by function call 112. The same dispatch strategy may also be used whenever there is an order among an overloaded function's implementations (e.g., a user-specified preference for dispatch, using the most-recently-written applicable member, etc.).

In one or more embodiments, function call 112 is resolved using a dispatch predicate that determines an applicability 214 of implementation 204 to function call 112 based on one or more dynamic types 206-208 for arguments of function call 112 and one or more signature types 210-212 of implementation 204. For example, the dispatch predicate may return false if implementation 204 is not applicable to function call 112 and true if implementation 204 is applicable to function call 112. If implementation 204 is not applicable, the dispatch predicate is repeated for one or more subsequent implementations in partial order 202 until an applicable implementation is found. If implementation 204 is applicable, the dispatch predicate may provide bindings 218 for any static type parameters present in signature types 210-212.

Dynamic types 206-208 may be type constant expressions which lack type variables but may contain tuples, arrows, instantiated-with-constants generic types, unions, Any, trait, and object types. Signature types 210-212 may include type variables, tuples, arrows, instantiated-with-signatures generic types, and type constants. A signature type may contain a union type appearing as a type constant, but elements of the union type cannot contain type variables. All types are also expressed in their canonical form, so it is known that if A and B are both terms of a union type, then neither is a subtype of the other.

During the determination of applicability 214, each dynamic type 206-208 for an argument of function call 112 is compared to the corresponding signature type 210-212 of implementation 204 based on a variance 220-222 (e.g., covariant, invariant, contravariant) of the dynamic type. If a subtype relationship between the dynamic type and the signature type does not conform to the variance, implementation 204 is determined to be not applicable to function call 112. If the subtype relationship conforms to the variance, implementation 204 is determined to be applicable to function call 112, and a set of initial limits 216 on one or more generic type parameters of implementation 204 are determined. Dispatch predicates for overloaded functions using type intervals are described in a co-pending non-provisional application by inventors Karl Naden, Justin Hilburn, David Chase, Guy Steele, Victor Luchangco and Eric Allen, entitled "Dispatch Predicate for Overloaded Functions using Type Intervals," having Ser. No. 13/601,745, and filing date 31 Aug. 2012, which is incorporated herein by reference.

For example, the dispatch predicate for determining applicability 214 may be implemented using a "match" function that takes three parameters: the first ("T") is a signature type (e.g., signature types 210-212) that may contain unbound static (e.g., generic) type parameters, the second ("V") is the variance (encoded as +1, 0, and −1, where positive is covariant, 0 is invariant, and negative is contravariant), and the third ("A") is an actual dynamic type (e.g., dynamic types 206-208) to be related to the signature type, subject to the specified variance. The "match" function may also rely on the set "S" of type names being inferred, and for each type name "t ϵS" augments upper and lower bound constraint sets "Ut" and "Lt" (e.g., initial limits 216).

If the type and signature cannot be related, then "match" fails. If the dynamic type and signature type can be related, "match" returns normally and adds necessary constraints to the upper and lower bound sets (e.g., initial limits 216), which are the input to type inference of the generic type parameters. Initial limits 216 may then be used to determine bindings 218 during type inference of generic type parameters, as described in a co-pending non-provisional application by inventors Karl Naden, David Chase and Justin Hilburn, entitled "Type Inference of Generic Type Parameters in Overloaded Functions using Type Intervals and Inference Directions," having Ser. No. 13/601,766, and filing date 31 Aug. 2012, which is incorporated herein by reference.

On the other hand, initial limits 216 may include a type interval with an unbounded lower limit for a generic type parameter, which results in more than one type-correct inference choice for the generic type parameter. If such a type interval is encountered, type inference on the generic type parameter may be deferred and/or delayed until information regarding the use of the generic type parameter (e.g., a type query for a dynamic type of the generic type parameter) is available. The information may then be used to update the lower limit of the type interval and perform type inference on the generic type parameter, as discussed in further detail below with respect to FIG. 3.

Figure 3:
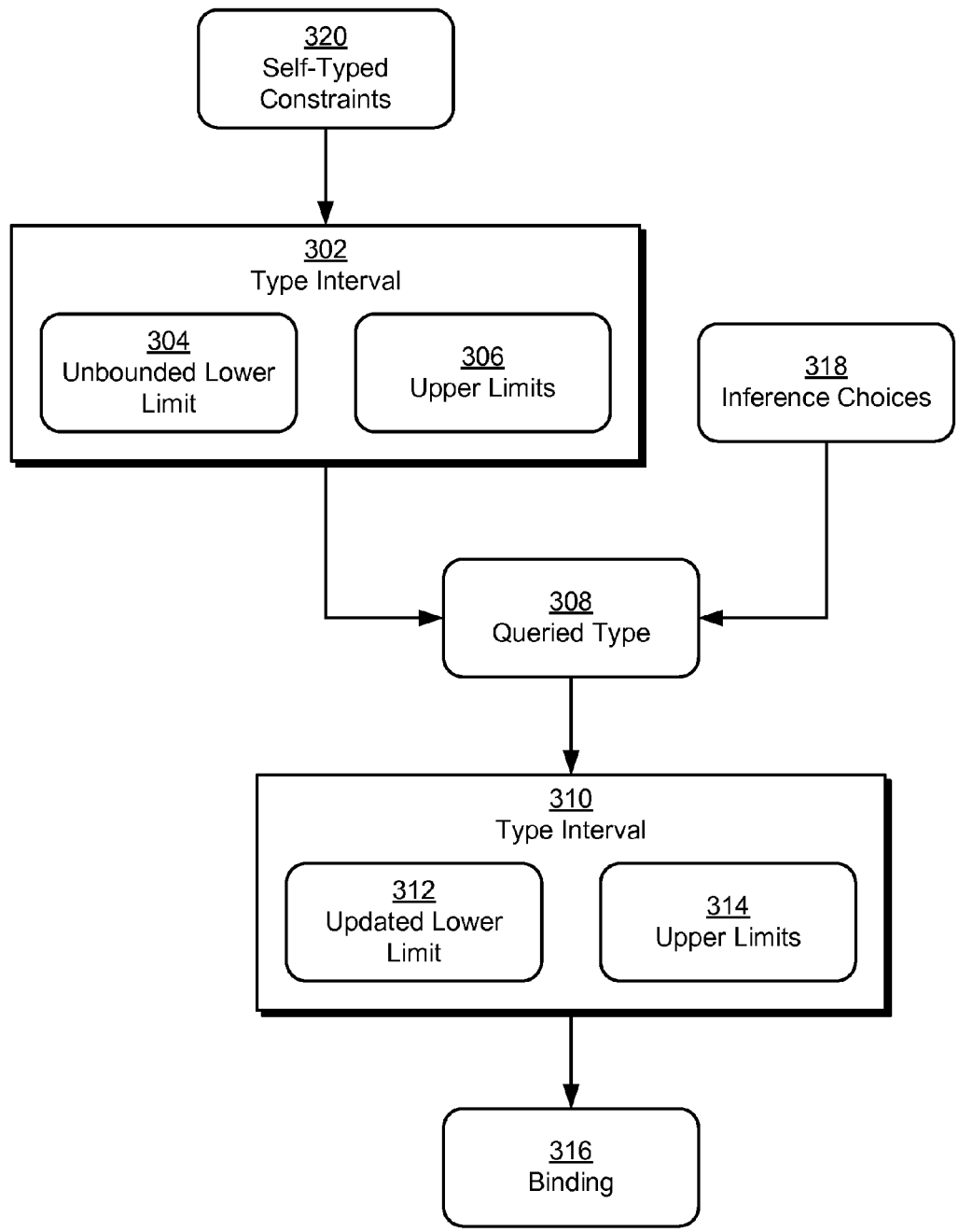
FIG. 3 shows type inference on generic type parameters of an implementation of an overloaded function in accordance with the disclosed embodiments.

FIG. 3 shows type inference on generic type parameters of an implementation of an overloaded function in accordance with the disclosed embodiments. As described in the above-referenced application, type inference may be performed after the implementation is initially determined to be applicable to a function call associated with the overloaded function (e.g., using the "match" function).

During type inference, a binding 316 for a generic type parameter of the implementation may be selected based on a type interval 302 and an inference direction (not shown) for the generic type parameter. Type interval 302 may be obtained from the "match" function described in the above-referenced applications.

As shown in FIG. 3, type interval 302 may include an unbounded lower limit 304 and one or more upper limits 306. Unbounded lower limit 304 may lack restrictions on the lower bounds of the generic type parameter. For example, unbounded lower limit 304 may include a "bottom" type, which is a subtype of every other type.

In addition, the generic type parameter may be associated with one or more self-typed constraints 320, which may require an upward search of self-types to adjust limits (e.g., unbounded lower limit 304, upper limits 306) in type interval 302 before binding 316 can be selected. However, the upward search may not be tractable from unbounded lower limit 304, resulting in multiple type-correct inference choices 318 for the generic type parameter that may be made from type interval 302. For example, inference choices 318 may include self-types that are bounded by upper limits 306 of type interval 302.

In one or more embodiments, type inference on the generic parameter is delayed and/or deferred until information regarding use of the generic type parameter is available. More specifically, the information may be obtained as a queried type 308 from a type query for a dynamic type of the generic type parameter.

To determine if queried type 308 is relevant to the generic type parameter, queried type 308 may be compared with inference choices 318. If queried type 308 matches an inference choice from inference choices 318, queried type 308 may be used as an updated lower limit 312 of a new type interval 310 for the generic type parameter, and type inference of the generic type parameter may be performed using updated lower limit 312 and one or more upper limits 314 from type interval 310 and/or a set of constraints for the generic type parameter. If queried type 308 does not match any inference choices 318, queried type 308 may not be relevant to the generic type parameter, and type inference of the generic type parameter may continue to be deferred and/or delayed.

Type inference of generic type parameters using the techniques described above may be illustrated with the following example. Suppose that Equality[T] is a covariant self-type that provides the ability to test equality:

```
trait Equality[covariant T] comprises T
    eq(other:T)
end
```

In addition, "f" is an overloaded function:

```
f(x:Any) :Any = x
f[T <: Equality[T]] (g:T -> Integer, d:T) : (T,T)->Integer =
    fn(x:T,y:T) => if x.eq(y) then g(d) else g(x) + g(y)
end
```

One very general implementation of "f" takes "x" with type Any (in other words, all possible inputs) and returns it. The second implementation applies when the input happens to be a 2-element tuple of function and default input, generic in T, where T must be a self-type with Equality, and that returns a function from tuples of (T, T) to integers. A body is provided to show that code implementing this contrived type signature is, in fact, possible. The second implementation is clearly more specific, and the pair of functions clearly obeys both the meet rule and return type rule; this is a legal overload using the Fortress rules.

Now consider the following declarations:
trait Q
    foo ( ): Integer
end
h(q:Q):Integer=q.foo( )
trait P extends {Equality[P], Q} . . . end
trait w extends {Equality [W], Q} . . . end
"h" is a function mapping Q to Integer. Because "P" and "W" both extend "Q," "g" may also be regarded as a function mapping "P" to Integer and mapping "Q" to Integer (that is, "Q->Integer" extends both "P->Integer" and "Q->Integer"). Furthermore, "P" and "Q" are both self-types with Equality; a pair of P's may be tested for Equality, and a pair of Q's may be tested for Equality. However, a "P" and a "Q" may not be tested for Equality.

Next, consider this invocation of "f" and its dynamic dispatch:
    a:Any=f(h)
There are two entrypoints, and the more specific is tested first for applicability:
    f[T<: Equality[T]](g:T->Integer):(T,T)->Integer
Notice that the type parameter T appears only in contravariant context; therefore T's inference goal is "upper." Pattern matching determines that "h" matches the structure of parameter "g"; it is a function returning Integer, and the constraint on T is that it lies within the interval [Bottom, Q].

Finally, consider the self-type constraint that must hold on T for dispatch to succeed; there needs to be at least one type T' above Bottom but below "Q" with the property that T' is a self-type with Equality. In this case, there are two ("P" and "W"), and two is more than one, so the dispatch test succeeds. Unfortunately, with two choices, there is no clear choice for the inference step.

One way to resolve this problem is simply to defer the choice until at some later operation the value makes it necessary. The result type of the overloaded function is "Any"; regarded as an Any, there is no particular need to make either choice. If, however, the result value is subject to a type query that matches one of its possible instantiations, then that instantiation is chosen. For example:

if a instanceof (P,P)->Integer then
(*) T can be P, therefore T is P (permanently)
. . .
end In the general case, other types may depend on the choice for T; dispatch predicate testing must ensure that each of the possible choices for T is compatible with successful inference of other type parameters, but computation of the exact choice(s) is suspended until a subsequent type query.

Figure 4:
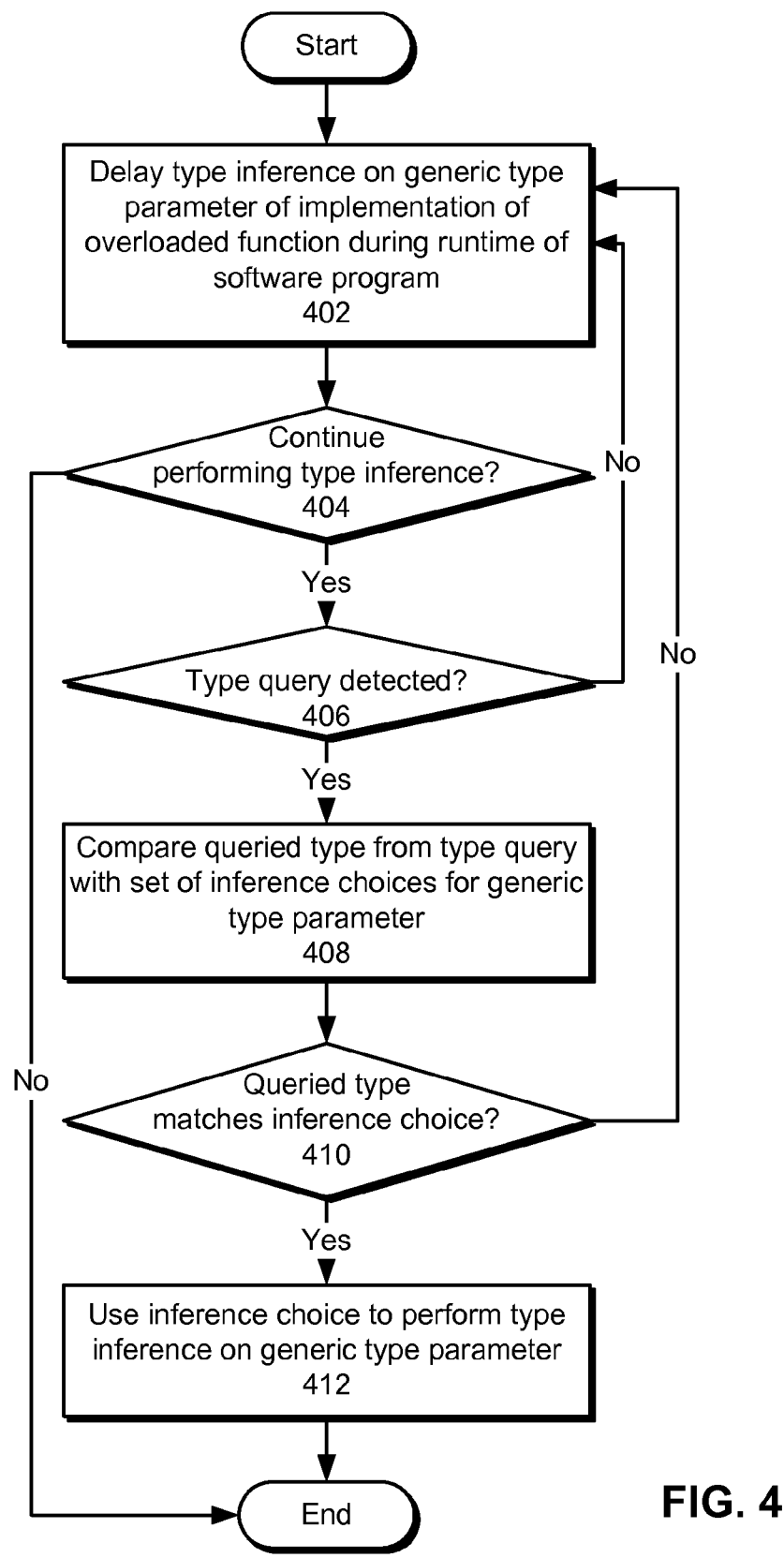
FIG. 4 shows a flowchart illustrating the process of facilitating the development and execution of a software program in accordance with the disclosed embodiments.

FIG. 4 shows a flowchart illustrating the process of facilitating the development and execution of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, type inference on a generic type parameter of an implementation of an overloaded function is delayed during runtime of the software program (operation 402). The generic type parameter may be associated with a type interval containing an unbounded lower limit and one or more self-typed constraints. As a result, the generic type parameter may have more than one type-correct inference choice.

Type inference of the generic type parameter and/or other generic type parameters may continue to be performed (operation 404) and/or delayed. For example, type inference of the generic type parameter(s) may be performed and/or delayed until bindings are chosen for the generic type parameter(s) and/or the software program is no longer running During type inference, a type query for a dynamic type of the generic type parameter may be detected (operation 406). If no type query is detected, type inference on the generic type parameter may continue to be delayed (operation 402) while type inference of generic type parameters of the software program is enabled (operation 404).

If the type query is detected, a queried type from the type query is compared with a set of inference choices for the generic type parameter (operation 408) to determine if the queried type matches an inference choice (operation 410) from the set of inference choices. For example, the queried type may be compared with inference choices that are bounded by one or more upper limits of the type interval.

If the queried type matches the inference choice, the inference choice is used to perform type inference on the generic type parameter (operation 412). For example, the inference choice may be used as an updated lower limit of the type interval, and a binding for the generic type parameter may be chosen based on the updated lower limit and/or a set of constraints associated with the generic type parameter using the techniques described in the above-referenced applications. If there are no constraints, the inference choice may be used as the binding for the generic type parameter.

If the queried type does not match the inference choice, type inference on the generic type parameter may continue to be delayed (operation 402) until a type query results in an inference choice that can be used to perform type inference on the generic type parameter (operations 404-412). Alternatively, type queries that are relevant to the generic type parameter may not be detected, and type inference of the generic type parameter beyond the unbounded lower limit may not occur during runtime of the software program.

Figure 5:
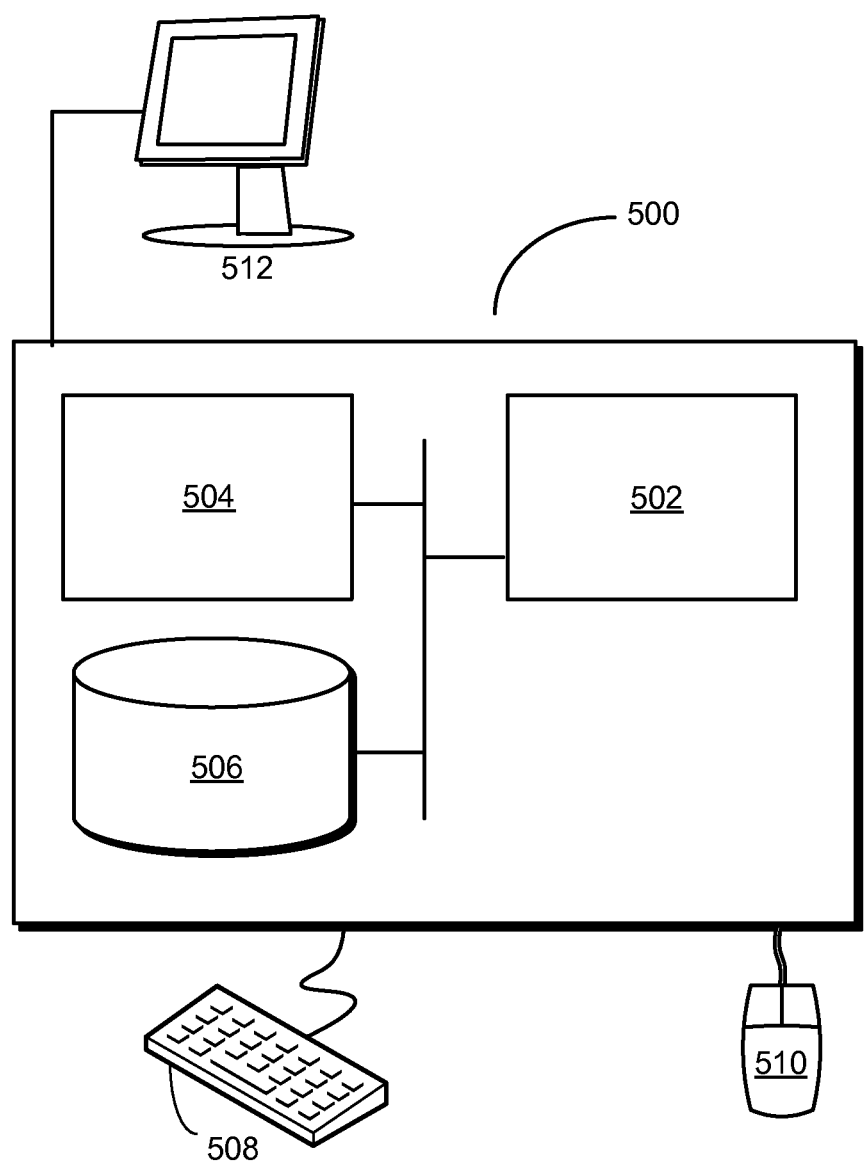
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the development and execution of a software program. The system may include a compilation manager and a runtime system. The compilation manager and/or runtime system may delay type inference on a generic type parameter of an implementation of an overloaded function, in which the generic type parameter is associated with a type interval comprising an unbounded lower limit and one or more self-typed constraints. Upon detecting a type query for a dynamic type of the generic type parameter, the compilation manager and/or runtime system may compare a queried type from the type query with a set of inference choices for the generic type parameter. If the queried type matches an inference choice from the set of inference choices, the compilation manager and/or runtime system may use the inference choice to perform type inference on the generic type parameter. If the queried type does not match any of the inference choices, the compilation manager and/or runtime system may continue to delay type inference on the generic type parameter.

In addition, one or more components of computer system 500 may be remotely located and connected to the other components over a network. Portions of the present embodiments (e.g., compilation manager, runtime system, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the development and execution of a software program, comprising during runtime of the software program:
   during runtime of the software program;
   delaying type inference on a generic type parameter of an implementation of an overloaded function that is invoked in the software program, wherein the generic type parameter is associated with a type interval comprising an unbounded lower limit and one or more self-typed constraints;
   upon detecting a type query for a dynamic type of the generic type parameter, comparing a queried type from the type query with a set of inference choices for the generic type parameter; and
   when the comparing indicates that the queried type matches an inference choice from the set of inference choices, using the inference choice to perform type inference on the generic type parameter;
   if the queried type does not match any of the inference choices, further delaying type inference on the generic type parameter.

2. The computer-implemented method of claim 1, wherein using the inference choice to perform type inference on the generic type parameter involves:
   using the inference choice as an updated lower limit of the type interval; and
   choosing a binding for the generic type parameter based on the updated lower limit.

3. The computer-implemented method of claim 2, wherein the binding is further chosen based on a set of constraints associated with the generic type parameter.

4. The computer-implemented method of claim 2, wherein choosing the binding for the generic type parameter based on the updated lower limit involves:
   if the generic type parameter is not associated with a set of constraints, using the inference choice as the binding for the generic type parameter.

5. The computer-implemented method of claim 1, wherein the set of inference choices is bounded by the type interval.

6. The computer-implemented method of claim 1, wherein the type interval further comprises an upper limit.

7. A system for facilitating the development and execution of a software program, comprising:
   a compilation manager for the software program; and
   a runtime system for the software program,
   wherein the compilation manager and the runtime system are configured to, during runtime of the software program:
   delay type inference on a generic type parameter of an implementation of an overloaded function that is invoked in the software program, wherein the generic type parameter is associated with a type interval comprising an unbounded lower limit and one or more self-typed constraints;
   upon detecting a type query for a dynamic type of the generic type parameter, compare a queried type from the type query with a set of inference choices for the generic type parameter; and
   when the comparing indicates that the queried type matches an inference choice from the set of inference choices, use the inference choice to perform type inference on the generic type parameter;
   if the queried type does not match any of the inference choices, the compilation manager and the runtime system are further configured to:
   further delay type inference on the generic type parameter.

8. The system of claim 7, wherein using the inference choice to perform type inference on the generic type parameter involves:
   using the inference choice as an updated lower limit of the type interval; and
   choosing a binding for the generic type parameter based on the updated lower limit.

9. The system of claim 8, wherein the binding is further chosen based on a set of constraints associated with the generic type parameter.

10. The system of claim 8, wherein choosing the binding for the generic type parameter based on the updated lower limit involves:
    if the generic type parameter is not associated with a set of constraints, using the inference choice as the binding for the generic type parameter.

11. The system of claim 7, wherein the set of inference choices is bounded by the type interval.

12. The system of claim 7, wherein the type interval further comprises an upper limit.

13. A computer-readable storage medium 2 storing instructions that when executed by a computer cause the computer to perform a method for facilitating the development and execution of a software program, the method comprising:

during runtime of the software program:

during runtime of the software program, delaying type inference on a generic type parameter of an implementation of an overloaded function that is invoked in the software program, wherein the genetic type parameter is associated with a type interval comprising an unbounded lower limit and one or more self-typed constraints;

upon detecting a type query for a dynamic type of the generic type parameter, comparing a queried type from the type query with a set of inference choices for the generic type parameter; and when the comparing indicates that the queried type matches an inference choice from the set of inference choices, using the inference choice to perform type inference on the genetic type parameter;

if the queried type does not match any of the inference choices, further delaying type inference on the generic type parameter.

14. The computer-readable storage medium of claim 13, wherein using the inference choice to perform type inference on the generic type parameter involves:

using the inference choice as an updated lower limit of the type interval; and choosing a binding for the generic type parameter based on the updated lower limit.

15. The computer-readable storage medium of claim 14, wherein the binding is further chosen based on a set of constraints associated with the generic type parameter.

16. The computer-readable storage medium of claim 14, wherein choosing the binding for the generic type parameter based on the updated lower limit involves:

if the generic type parameter is not associated with a set of constraints, using the inference choice as the binding for the generic type parameter.

17. The computer-readable storage medium of claim 13, wherein the set of inference choices is bounded by the type interval.

* * * * *

UNITED STATES PATENT AND TRADEMARK OFFICE
CERTIFICATE OF CORRECTION

PATENT NO. : 8,893,098 B2  
APPLICATION NO. : 13/714818  
DATED : November 18, 2014  
INVENTOR(S) : Chase Page 1 of 1

It is certified that error appears in the above-identified patent and that said Letters Patent is hereby corrected as shown below:

In the Specification

In column 5, line 48, delete "$S_a$)" and insert -- $S_n$) --, therefor.

In column 5, line 48, delete "$T_a$.)" and insert -- $T_n$.) --, therefor.

In column 6, line 52, delete "x:x" and insert -- x:X --, therefor.

In column 7, line 5, delete "oft" and insert -- of t --, therefor.

In column 7, line 6, delete "X#Y:" and insert -- X ∩ Y: --, therefor.

In column 7, line 16, delete "#" and insert -- ∪ --, therefor.

In column 11, line 34, delete "w" and insert -- W --, therefor.

In the Claims

In column 15, line 5, in Claim 13, delete "medium 2" and insert -- medium --, therefor.

In column 15, line 13, in Claim 13, delete "genetic" and insert -- generic --, therefor.

In column 15, line 24, in Claim 13, delete "genetic" and insert -- generic --, therefor.

Signed and Sealed this  
Twenty-third Day of June, 2015

Michelle K. Lee  
*Director of the United States Patent and Trademark Office*